US010797808B2

(12) United States Patent
Qi et al.

(10) Patent No.: US 10,797,808 B2
(45) Date of Patent: Oct. 6, 2020

(54) METHOD FOR TESTING WIRELESS PERFORMANCE OF MIMO WIRELESS TERMINAL

(71) Applicant: GENERAL TEST SYSTEMS INC., Shenzhen, Guangdong (CN)

(72) Inventors: Yihong Qi, Guangdong (CN); Penghui Shen, Guangdong (CN)

(73) Assignee: GENERAL TEST SYSTEMS INC., Shenzhen, Guangdong (CN)

( * ) Notice: Subject to any disclaimer, the term of this patent is extended or adjusted under 35 U.S.C. 154(b) by 427 days.

(21) Appl. No.: 15/751,732

(22) PCT Filed: Nov. 9, 2017

(86) PCT No.: PCT/CN2017/110259
§ 371 (c)(1),
(2) Date: Feb. 9, 2018

(87) PCT Pub. No.: WO2018/107927
PCT Pub. Date: Jun. 21, 2018

(65) Prior Publication Data
US 2020/0213018 A1    Jul. 2, 2020

(30) Foreign Application Priority Data
Dec. 14, 2016    (CN) .......................... 2016 1 1154847

(51) Int. Cl.
*H04B 17/15* (2015.01)
*H04B 17/12* (2015.01)
(Continued)

(52) U.S. Cl.
CPC ........... *H04B 17/15* (2015.01); *H04B 7/0413* (2013.01); *H04B 17/12* (2015.01); *H04B 17/21* (2015.01)

(58) Field of Classification Search
CPC ........ H04B 17/15; H04B 17/12; H04B 17/21; H04B 7/0413
See application file for complete search history.

(56) References Cited

U.S. PATENT DOCUMENTS 6,771,698 B1   8/2004  Beck
9,614,627 B2   4/2017  Yu et al.
(Continued)

FOREIGN PATENT DOCUMENTS

CN    102122994 A    7/2011
CN    103856272 A    6/2014
(Continued)

OTHER PUBLICATIONS

International Search Report and Written Opinion dated Jan. 30, 2018 for corresponding International Application No. PCT/CN2017/110259, filed Nov. 9, 2017.
(Continued)

*Primary Examiner* — Freshteh N Aghdam
(74) *Attorney, Agent, or Firm* — David D. Brush; Westman, Champlin & Koehler, P.A.

(57) ABSTRACT

A method for testing wireless performance of a MIMO wireless terminal includes: obtaining antenna pattern information of a plurality of antennas of the MIMO wireless terminal tested in an electromagnetic anechoic chamber; further obtaining a test signal according to the antenna pattern information of the MIMO wireless terminal; calibrating the test signal by using an error calibration joint matrix of the MIMO wireless terminal so as to obtain a transmitting signal for testing; and finally feeding the transmitting signal for testing into a plurality of measurement antennas of the electromagnetic anechoic chamber and
(Continued)

transmitting the transmitting signal to the wireless terminal through the measurement antennas so as to test the wireless terminal.

16 Claims, 4 Drawing Sheets

(51) Int. Cl.
*H04B 17/21* (2015.01)
*H04B 7/0413* (2017.01)

(56) References Cited

U.S. PATENT DOCUMENTS

| | | | |
|---|---|---|---|
| 9,866,294 B1* | 1/2018 | Bartko | H04B 17/15 |
| 2002/0160717 A1 | 10/2002 | Persson et al. | |
| 2008/0129615 A1 | 6/2008 | Breit et al. | |
| 2015/0280844 A1* | 10/2015 | Yu | H04B 17/0085 375/224 |
| 2016/0212641 A1* | 7/2016 | Kong | H04B 17/0087 |
| 2016/0226709 A1* | 8/2016 | Chen | H04L 1/0007 |
| 2016/0233970 A1* | 8/2016 | Reed | H04B 17/12 |
| 2018/0062971 A1* | 3/2018 | Kyosti | H04L 43/50 |

FOREIGN PATENT DOCUMENTS

| | | |
|---|---|---|
| JP | 2005257298 A | 9/2005 |
| JP | 2015117974 A | 6/2015 |
| JP | 2016519450 A | 6/2016 |

OTHER PUBLICATIONS

Supplemental European Search Report dated Feb. 12, 2019 for corresponding European Application No. 17835576.4.
English translation of the International Search Report dated Jan. 30, 2018, for corresponding International Application No. PCT/CN2017/110259, filed Nov. 9, 2017.
English translation of the Japanese Office Action, dated Aug. 26, 2019 for corresponding Japanese Application No. 2018-549897.

\* cited by examiner

METHOD FOR TESTING WIRELESS PERFORMANCE OF MIMO WIRELESS TERMINAL

CROSS-REFERENCE TO RELATED APPLICATIONS

This application is a national phase application of International Application No. PCT/CN2017/110259, filed with the State Intellectual Property Office of P. R. China on Nov. 9, 2017, which claims priority to and benefits of Chinese Patent Application Serial No. 201611154847.0 filed with the State Intellectual Property Office of P. R. China on Dec. 14, 2016 by GENERAL TEST SYSTEMS INC, the entire contents of which are incorporated herein by reference.

FIELD

The present disclosure relates to the field of antenna, and more particularly to a method for testing wireless performance of a MIMO wireless terminal.

BACKGROUND

The main test standards provided by Cellular Telecommunications and Internet Association (CTIA) and 3rd Generation Partnership Project (3GPP) are a multi-probe method and a two-step radiation method.

Specifically, regarding the two-step radiation method of the MIMO test method, as shown in FIG. 1, a test process thereof mainly includes the following steps:

step I, obtaining antenna pattern information of a plurality of antennas of a Multiple-Input Multiple-Output (MIMO) wireless terminal, in which the antenna pattern information contains gain information in a plurality of directions of each antenna and phase difference information of any two antennas receiving the same information in a plurality of directions;

step II, simulating a complete MIMO transmission channel by fusing the antenna pattern information of the plurality of antennas of the wireless terminal obtained and a preset MIMO channel propagation model so as to further generate a throughput test signal;

step III, determining a calibration matrix for the wireless terminal in an anechoic chamber according to relative positions and directions of the plurality of antennas of the wireless terminal to measurement antennas in the anechoic chamber, and then generating a transmitting signal for testing according to the calibration matrix and the throughput test signal obtained;

step IV, feeding the transmitting signal for testing into the plurality of measurement antennas of the electromagnetic anechoic chamber and transmitting the transmitting signal to the wireless terminal through the measurement antennas so as to test the wireless terminal.

In step I of the two-step radiation method, the acquisition of the antenna pattern information relies on an amplitude and phase difference returning system of the wireless terminal, as shown in FIG. 2, which reports an intensity of the signal received by each receiver and a phase difference between any two received signals to a test instrument in an over-the-air (OTA) manner, and the reported data is used to calculate the antenna pattern of the MIMO wireless terminal.

However, in an actual measurement, there is a test error in the amplitude and phase difference returning system. Specifically, in general, for the amplitude and phase difference returning system of the MIMO wireless terminal, the test error of the reported data contains an amplitude test error of greater than 3 dB and a phase test error of at least 10°.

On the one hand, the test error is not the same for each MIMO wireless terminal and cannot be evaluated and quantified under the OTA conditions.

On the other hand, since a conduction test is invasive, the exact value of the error cannot be obtained even if the amplitude and phase difference returning system takes a conduction method to report the data to the test instrument.

Therefore, the test error is an unknown data that cannot be quantified in the related art. Moreover, the test error is introduced in the first stage of the two-step radiation method and exists in the entire testing process, thus ultimately affecting the accuracy and repeatability of the MIMO wireless terminal test.

SUMMARY

The present disclosure seeks to solve at least one of the problems that exist in the related art to at least some extent.

For this, in embodiments of a first aspect of the present disclosure, there is provided a method for testing wireless performance of a MIMO wireless terminal, in which the MIMO wireless terminal has a plurality of antennas and is placed in an electromagnetic anechoic chamber, the method includes:

A. obtaining antenna pattern information of the plurality of antennas of the MIMO wireless terminal;

B. obtaining a test signal according to the antenna pattern information of the MIMO wireless terminal;

C. calibrating the test signal by using an error calibration joint matrix of the MIMO wireless terminal so as to obtain a transmitting signal for testing;

D. feeding the transmitting signal for testing into a plurality of measurement antennas of the electromagnetic anechoic chamber and transmitting the transmitting signal to the wireless terminal through the measurement antennas so as to test the wireless terminal.

In embodiments of a second aspect of the present disclosure, there is provided a device for testing wireless performance of a MIMO wireless terminal, including:

a processor; and
a memory for storing instructions executable by the processor;

wherein the processor is configured to:

A. obtain antenna pattern information of the plurality of antennas of the MIMO wireless terminal;

B. obtain a test signal according to the antenna pattern information of the MIMO wireless terminal;

C. calibrate the test signal by using an error calibration joint matrix of the MIMO wireless terminal so as to obtain a transmitting signal for testing;

D. feed the transmitting signal for testing into a plurality of measurement antennas of the electromagnetic anechoic chamber and transmit the transmitting signal to the wireless terminal through the measurement antennas so as to test the wireless terminal.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
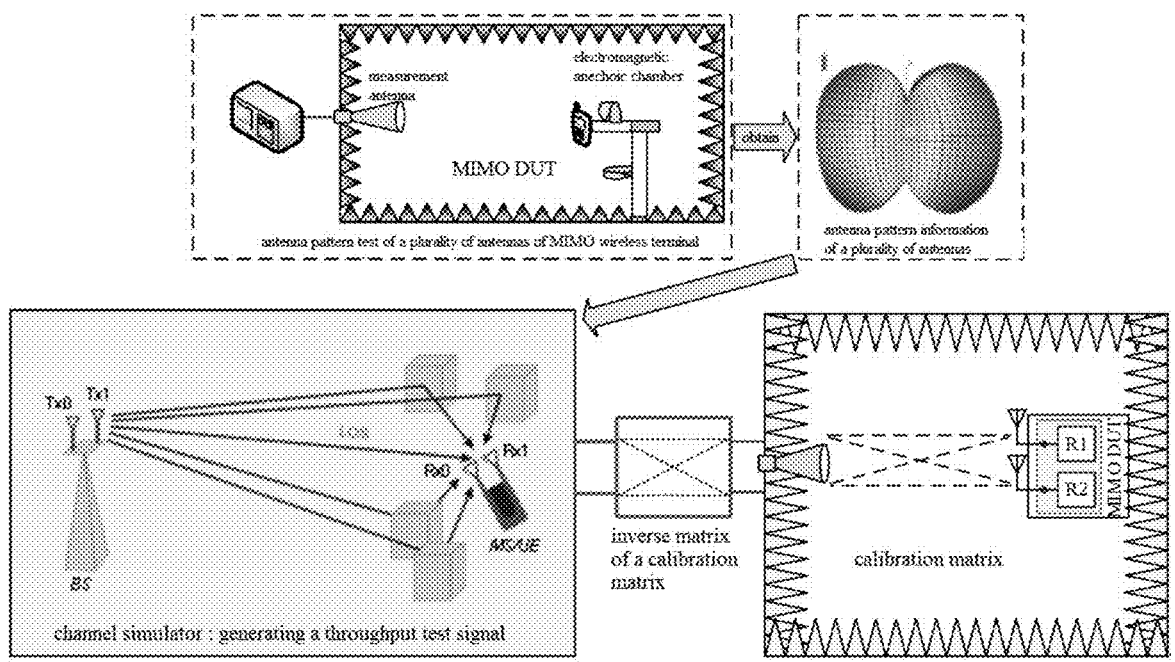
FIG. 1 is a schematic diagram of a two-step radiation method.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" means two or more than two, unless specified otherwise.

In embodiments of a first aspect of the present disclosure, there is provided a method for testing wireless performance of a MIMO wireless terminal, in which the MIMO wireless terminal has a plurality of antennas and is placed in an electromagnetic anechoic chamber, the method includes:

A. obtaining antenna pattern information of the plurality of antennas of the MIMO wireless terminal;

B. obtaining a test signal according to the antenna pattern information of the MIMO wireless terminal;

C. calibrating the test signal by using an error calibration joint matrix of the MIMO wireless terminal so as to obtain a transmitting signal for testing;

D. feeding the transmitting signal for testing into a plurality of measurement antennas of the electromagnetic anechoic chamber and transmitting the transmitting signal to the wireless terminal through the measurement antennas so as to test the wireless terminal.

The method for testing wireless performance of a MIMO wireless terminal includes: obtaining the antenna pattern information of the plurality of antennas of the MIMO wireless terminal tested in electromagnetic anechoic chamber; further obtaining the test signal according to the antenna pattern information of the MIMO wireless terminal; calibrating the test signal by using the error calibration joint matrix of the MIMO wireless terminal so as to obtain the transmitting signal for testing; and finally feeding the transmitting signal for testing into the plurality of measurement antennas of the electromagnetic anechoic chamber and transmitting the transmitting signal to the wireless terminal through the measurement antennas so as to test the wireless terminal. As the transmitting signal for testing is obtained by calibrating the test signal with the error calibration joint matrix of the MIMO wireless terminal, a test error is eliminated, thus solving a technical problem in the related art that the test error cannot be quantified such that the accuracy and repeatability for testing the MIMO wireless terminal are affected.

Further, in an embodiment of the present disclosure, the error calibration joint matrix is determined according to returning information of an amplitude and phase difference returning system of the MIMO wireless terminal.

Further, in an embodiment of the present disclosure, the error calibration joint matrix EA is a product of an error matrix E and a calibration matrix A;

in which the error matrix E is $$\begin{bmatrix} E_1 e^{j\psi_1} & 0 & \cdots & 0 \\ 0 & E_2 e^{j\psi_2} & \cdots & 0 \\ \vdots & \vdots & & \vdots \\ 0 & 0 & \cdots & E_U e^{j\psi_U} \end{bmatrix};$$

where $E_u e^{j\psi_u}$ is a test error of a $u^{th}$ ($u \geq 1$) receiving antenna, and the test error is introduced by the amplitude and phase difference returning system, $E_u$ is an amplitude measurement error, and $e^{j\psi_u}$ is a phase measurement error;

the calibration matrix A is $$\begin{bmatrix} a_{11} & a_{12} & \cdots & a_{1U} \\ a_{21} & a_{22} & \cdots & a_{2U} \\ \vdots & \vdots & & \vdots \\ a_{U1} & a_{U2} & \cdots & a_{UU} \end{bmatrix},$$

where a factor $a_{ij}$ of the calibration matrix is path multiplexing gain information from an input port of a $j^{th}$ transmitting antenna to an output port of an $i^{th}$ receiving antenna.

Further, in an embodiment of the present disclosure, a factor of the error calibration joint matrix is $a_{ij} E_i e^{j\psi_i}$ (i,j=1, 2, ..., U);

where $a_{ij} E_i e^{j\psi_i}$ satisfies the following relation:

$$a_{ij} E_i e^{j\psi_i} = RS_{ij}/P_{emj};$$

where $P_{emj}$ is an transmitting power of a signal transmitted by the $j^{th}$ transmitting antenna, and $RS_{ij}$ is a returning value of the power and the phase received by the output port of the $i^{th}$ receiving antenna.

Further, in an embodiment of the present disclosure, obtaining a test signal according to the antenna pattern information of the MIMO wireless terminal includes:

generating the test signal by fusing the antenna pattern information of the MIMO wireless terminal and a preset MIMO signal propagation model.

Further, in an embodiment of the present disclosure, the antenna pattern information includes gain information in a plurality of directions and/or phase difference information of any two antennas receiving the same information in a plurality of directions.

Further, in an embodiment of the present disclosure, the number of the measurement antennas in the electromagnetic anechoic chamber is greater than or equal to the number of antennas of the wireless terminal.

Further, in an embodiment of the present disclosure, the measurement antenna and the wireless terminal remain stationary in step D.

Further, in an embodiment of the present disclosure, the test is a throughput test.

Further, in an embodiment of the present disclosure, obtaining antenna pattern information of the plurality of antennas of the MIMO wireless terminal includes:

measuring the antenna pattern information of the plurality of antennas of the MIMO wireless terminal in the electromagnetic anechoic chamber; the electromagnetic anechoic chambers used in step A and step D are the same.

Further, in an embodiment of the present disclosure, some measurement antennas among the plurality of measurement antennas are horizontally polarized antennas, and other measurement antennas among the plurality of measurement antennas are vertically polarized antennas.

Further, in an embodiment of the present disclosure, the number of the measurement antennas is 2, the number of the receiving antennas of the MIMO wireless terminal is 2;

the error calibration joint matrix is $$EA = \begin{bmatrix} EA_{11} & EA_{12} \\ EA_{21} & EA_{22} \end{bmatrix};$$

where $EA_{11}=RS_{11}/P_{em1}$, $EA_{21}=RS_{21}/P_{em1}$, $EA_{12}=RS_{12}/P_{em2}$, $EA_{22}=RS_{22}/P_{em2}$;

$RS_{11}$ is a returning value of a power and a phase received by an output port of a first receiving antenna when a first measurement antenna transmits a signal EM1 with a transmitting power $P_{em1}$;

$RS_{21}$ is a returning value of a power and a phase received by an output port of a second receiving antenna when the first measurement antenna transmits the signal EM1 with the transmitting power $P_{em1}$;

$RS_{12}$ is a returning value of the power and the phase received by the output port of the first receiving antenna when a second measurement antenna transmits a signal EM2 with a transmitting power $P_{em2}$;

$RS_{22}$ is a returning value of the power and the phase received by the output port of the second receiving antenna when the second measurement antenna transmits the signal EM2 with the transmitting power $P_{em2}$.

The method for testing wireless performance of a MIMO wireless terminal according to an embodiment of the present disclosure is described below with reference to FIG. 2. The MIMO wireless terminal has a plurality of antennas and is placed in an electromagnetic anechoic chamber. The number of the measurement antennas in the electromagnetic anechoic chamber is greater than or equal to the number of antennas of the wireless terminal.

Figure 2:
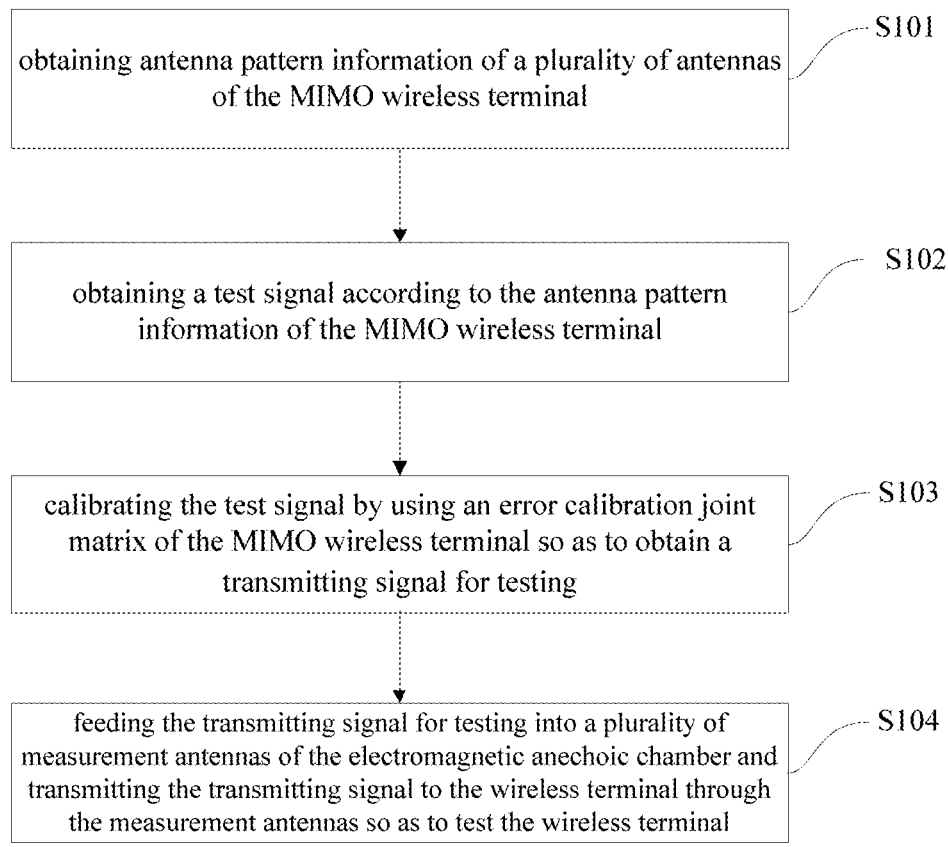
FIG. 2 is a flowchart of a method for testing wireless performance of a MIMO wireless terminal according to an embodiment of the present disclosure.

As shown in FIG. 2, for a U×S MOMO system, the method for testing wireless performance of the MIMO wireless terminal according to an embodiment of the present disclosure includes the following steps.

Step S101: antenna pattern information of a plurality of antennas of the MIMO wireless terminal is obtained.

The antenna pattern information includes gain information in a plurality of directions and/or phase difference information of any two antennas receiving the same information in a plurality of directions. Antenna pattern is one of the performances of the antenna. In an embodiment of the present disclosure, antenna pattern information of the plurality of antennas of the MIMO wireless terminal is obtained by measurement. In another embodiment of the present disclosure, antenna pattern information of the plurality of antennas of the MIMO wireless terminal is obtained by an antenna pattern which has been measured. Several performance parameters including the antenna pattern, the gain information and phase information may be tested in performance test of the antennas of the MIMO wireless terminals. The above performance test may be accomplished by an OTA test system used for Single Input Single Output (SISO) mobile communication system. In other words, the OTA test system used for SISO terminals may realize the measurement of the antenna pattern information of the antennas of the MIMO wireless terminal.

Figure 3A:
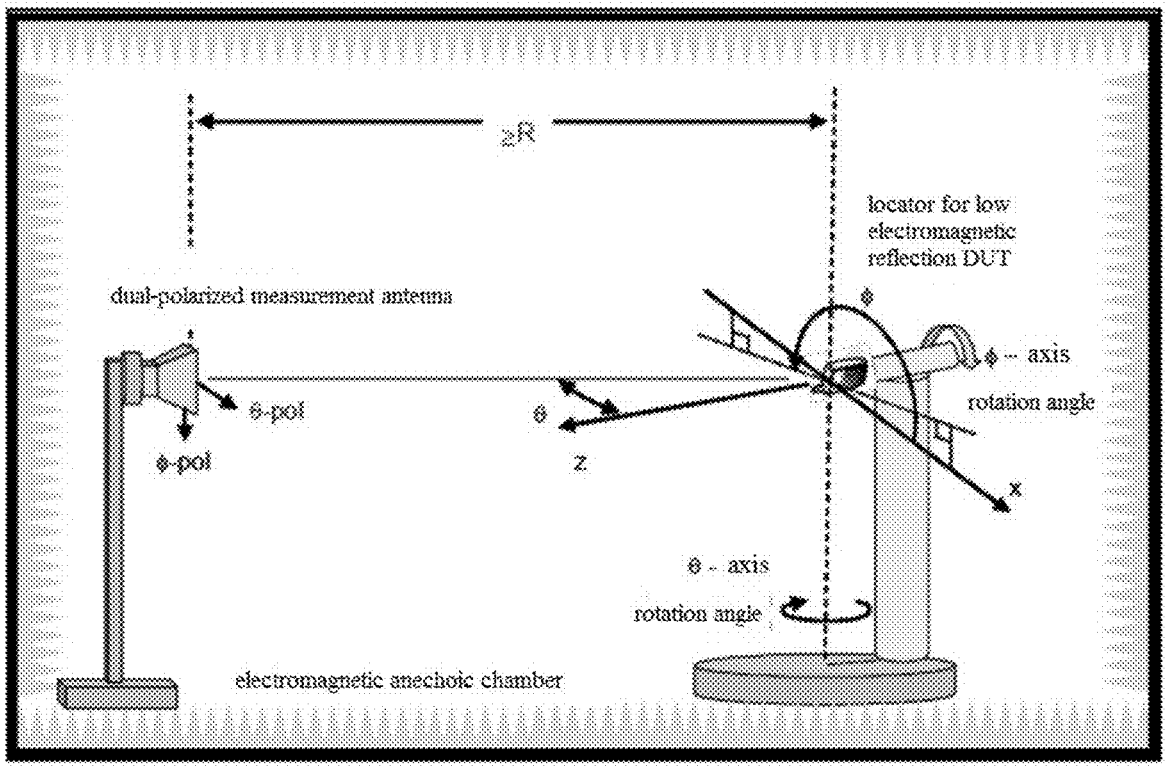
FIG. 3a is a schematic diagram for illustrating the measurement of the antenna pattern of a plurality of antennas of the MIMO wireless terminal according to an embodiment of the present disclosure.
Figure 3B:
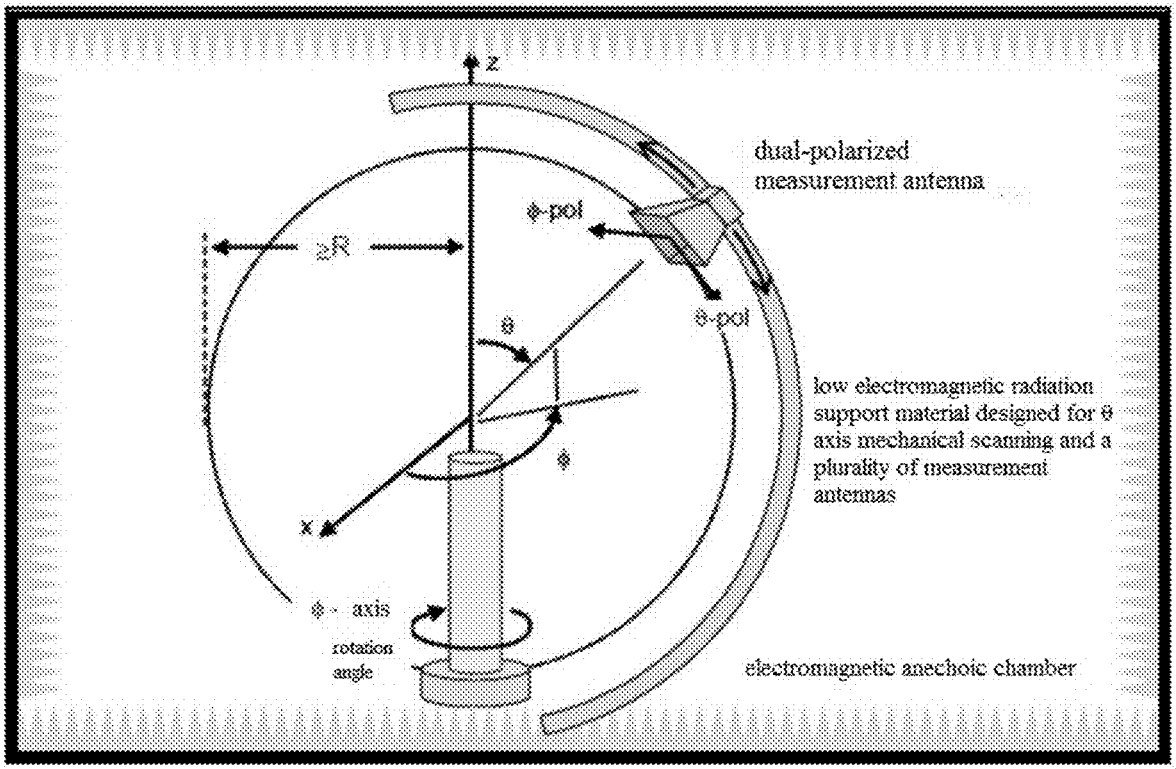
FIG. 3b is another schematic diagram for illustrating the measurement of the antenna pattern of a plurality of antennas of the MIMO wireless terminal according to an embodiment of the present disclosure.

The measurement of the antenna pattern of the plurality of antennas of the MIMO wireless terminal is described by taking FIG. 3*a* and FIG. 3*b* as examples.

As shown in FIG. 3*a* and FIG. 3*b*, the MIMO wireless terminal (device under test, DUT) is placed in a center of a turntable, and a distance between the measurement antenna and the MIMO wireless terminal meets standard requirements. When the MIMO wireless terminal is rotated, the transmitting and receiving performances of the MIMO wireless terminal in all spatial directions are tested and obtained by the measurement antenna. For each receiving antenna of the MIMO terminal, the antenna pattern information, gain information, polarization information, and phase information are required to be tested.

The MIMO wireless terminal may have a variety of placement states such as free space, with a head phantom, with a hand phantom, handheld, and the like. According to user's requirements, the antenna performance of the MIMO wireless terminal in one of the placement states or in each placement state may be tested.

Figure 4:
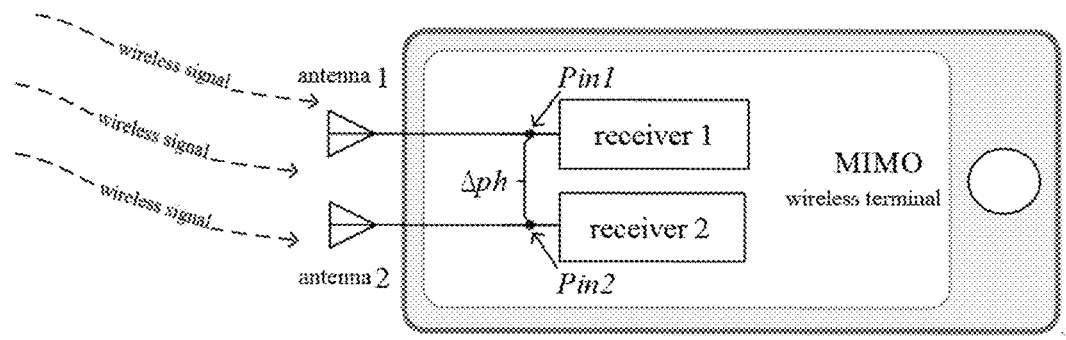
FIG. 4 is sketch diagram of a radio frequency system in an MIMO wireless terminal.

Through the above manners, the antenna pattern information of the plurality of antennas of the MIMO wireless terminal may be tested and obtained. During the test of the antenna pattern, as shown in FIG. 4, it is required to measure a port power value of a receiver and a downlink power of a front end of each receiving antenna, and to calculate a ratio of a power received by an input port of the receiving antenna to the downlink power so as to obtain the antenna gain.

The port power value of the receiver is returned by an amplitude and phase difference returning system (abbreviated as returning system) of the MIMO wireless terminal, i.e., is calculated by a chip of the MIMO wireless terminal itself and returned to a test instrument. Therefore, the returned power value contains an amplitude returning error. Since the phase difference between signals received by any two receiving antennas is also calculated by the chip itself and reported to the test instrument, the phase returning value contains a phase returning error.

Thus, a relationship between the pattern information and the actual pattern information of the MIMO wireless terminal is as follows:

$$\begin{bmatrix} F_u^{R_X(v)}(\Omega_l^{R_X}) \times E_u e^{j\psi_u} \\ F_u^{R_X(h)}(\Omega_l^{R_X}) \times E_u e^{j\psi_u} \end{bmatrix} = \begin{bmatrix} R|F_u^{R_X(v)}(\Omega_l^{R_X}) \\ R|F_u^{R_X(h)}(\Omega_l^{R_X}) \end{bmatrix}, \quad (1)$$

where $R_u^{R_X(v)}(\Omega_l^{R_X})$ is a true value of v-polaraization multiplexing gain of a $u^{th}$ ($u \geq 1$) receiving antenna, the polarization multiplexing gain herein contains the gain and a phase shift; $F_u^{R_X(h)}(\Omega_l^{R_X})$ is a true value of h-polarization multiplexing gain of the $u^{th}$ (u≥1) receiving antenna; $R|F_u^{R_X(v)}(\Omega_l^{R_X})$ is an actual measurement value of v-polarization multiplexing gain of the $u^{th}$ (u≥1) receiving antenna; $R|F_u^{R_X(h)}(\Omega_l^{R_X})$ is an actual measurement value of h-polarization multiplexing gain of the $u^{th}$ (u≥1) receiving antenna; $E_u e^{j\psi_u}$ is a test error of the $u^{th}$ (u≥1) receiving antenna which is introduced by the returning system, $E_u$ represents the corresponding amplitude measurement error, and $e^{j\psi_u}$ represents the corresponding phase measurement error.

Step S102, a test signal is obtained according to the antenna pattern information of the MIMO wireless terminal.

Specifically, the antenna pattern information of the plurality of antennas of the wireless terminal obtained in step S101 is fused with a preset MIMO channel propagation model so as to simulate a complete MIMO transmission channel and to generate the test signal, and the test signal herein may be a throughput test signal.

The channel propagation model is formulated by a standard organization to simulate a typical environment in which the MIMO wireless terminal operates. In this embodiment, in order to make the derivation of the test signal more universal, a 3D channel model is taken as an example for illustration.

For a U×S MIMO system, theoretically, a relationship between signals $$\begin{bmatrix} B_1 \\ B_2 \\ \vdots \\ B_S \end{bmatrix}$$

sent from a base station and throughput test signals $$\begin{bmatrix} T_1 \\ T_2 \\ \vdots \\ T_U \end{bmatrix}$$

should satisfy the following relationship:

$$\begin{bmatrix} T_1 \\ T_2 \\ \vdots \\ T_U \end{bmatrix} = H(t) \times \begin{bmatrix} B_1 \\ B_2 \\ \vdots \\ B_S \end{bmatrix}, \quad (2)$$

where $H(t)$ is a channel correlation matrix, a $(u,s)^{th}$ factor (u=1, 2, ..., U; s=1, 2, ..., S) in the channel correlation matrix may be expressed as:

$$h_{u,s}(t) = \quad (3)$$

$$\sqrt{P_{us}} \lim_{K,L\to\infty} \frac{1}{\sqrt{KL}} \sum_{k=1}^{K} \sum_{l=1}^{L} g_{l,k} \exp(-jk_0(D_{sk}+D_{kl}+D_{lu})) \exp$$

$$(-jk_1 vt) \times \begin{bmatrix} F_s^{T_X(v)}(\Omega_k^{T_X}) \\ F_s^{T_X(h)}(\Omega_k^{T_X}) \end{bmatrix}^T \times$$

-continued $$\begin{bmatrix} \exp(j\Phi_{l,k}^{(v,v)}) & \sqrt{k_{l,k}^h}\sqrt{\chi_{l,k}}\exp(j\Phi_{l,k}^{(v,h)}) \\ \sqrt{k_{l,k}^v}\exp(j\Phi_{l,k}^{(h,v)}) & \sqrt{\chi_{l,k}}\exp(j\Phi_{l,k}^{(h,h)}) \end{bmatrix} \times$$

$$\begin{bmatrix} F_u^{R_X(v)}(\Omega_l^{R_X}) \\ F_u^{R_X(h)}(\Omega_l^{R_X}) \end{bmatrix},$$

where $P_{us}$ represents a power transmitted through a diameter $T_{X_s}$–$R_{X_u}$; $g_{l,k}$ and $\Phi_{l,k}^{(x,y)}$ are power and phase shifts between V (H) polarization of a transmitting antenna and V (H) polarization of the receiving antenna caused by scatterers $TS_k$ and $RS_l$; $D_{sk}$ is a distance from the scatterer $TS_k$ to an $s^{th}$ transmitting antenna $T_{X_s}$; $D_{lu}$ is a distance from the scatterer $RS_l$ to the $u^{th}$ receiving antenna $R_{X_u}$; $D_{kl}$ is a distance from the scatterer $TS_k$ to the scatterer $RS_l$; $F_s^{T_X(v)}(\Omega_k^{T_X})$ is multiplexing gain information of the $s^{th}$ transmitting antenna $T_{X_s}$ at v polarization and an $\Omega_k^{T_X}$ angle; $F_s^{T_X(h)}(\Omega_k^{T_X})$ is multiplexing gain information of the $s^{th}$ transmitting antenna $T_{X_s}$ at h polarization and the $\Omega_k^{T_X}$ angle; $F_u^{R_X(v)}(\Omega_l^{R_X})$ is true and accurate multiplexing gain information of the $u^{th}$ receiving antenna $R_{X_u}$ at v polarization and the $\Omega_l^{R_X}$ angle; $F_u^{R_X(h)}(\Omega_l^{R_X})$ is true and accurate multiplexing gain information of the $u^{th}$ receiving antenna $R_{X_u}$ at h polarization and the $\Omega_l^{R_X}$ angle; $k_{l,k}^v$ and $k_{l,k}^h$ represent cross polarization discrimination (XPD) of the channel model; $\chi_{l,k}$ represents cross polarization rate (CPR) of the channel model; $\lambda$ represents a wavelength; and $k_1$ represents a propagation direction.

Since, in fact, the error is introduced by the returning system into the pattern information, the $(u,s)^{th}$ factor $R|h_{u,s}(t)$ in the channel correlation matrix $R|H(t)$ that actually contains the error and is derived from equations (2) and (3) may be expressed as follows:

$$R|h_{u,s}(t) = \quad (4)$$

$$\sqrt{P_{us}} \lim_{K,L\to\infty} \frac{1}{\sqrt{KL}} \sum_{k=1}^{K} \sum_{l=1}^{L} g_{l,k} \exp(-jk_0(D_{sk}+D_{kl}+D_{lu}))$$

$$\exp(-jk_1 vt) \times \begin{bmatrix} F_s^{T_X(v)}(\Omega_k^{T_X}) \\ F_s^{T_X(h)}(\Omega_k^{T_X}) \end{bmatrix}^T \times$$

$$\begin{bmatrix} \exp(j\Phi_{l,k}^{(v,v)}) & \sqrt{k_{l,k}^h}\sqrt{\chi_{l,k}}\exp(j\Phi_{l,k}^{(v,h)}) \\ \sqrt{k_{l,k}^v}\exp(j\Phi_{l,k}^{(h,v)}) & \sqrt{\chi_{l,k}}\exp(j\Phi_{l,k}^{(h,h)}) \end{bmatrix} \times$$

$$\begin{bmatrix} R|F_u^{R_X(v)}(\Omega_l^{R_X}) \\ R|F_u^{R_X(h)}(\Omega_l^{R_X}) \end{bmatrix}.$$

Furthermore, a formula of the throughput test signals in the actual test is:

$$\begin{bmatrix} R|T_1 \\ R|T_2 \\ \vdots \\ R|T_U \end{bmatrix} = R|H(t) \times \begin{bmatrix} B_1 \\ B_2 \\ \vdots \\ B_S \end{bmatrix}. \quad (5)$$

Based on the above analysis, it can be seen that in the two-step radiation method, the actual throughput test signal contains an amplitude and phase error $E_u e^{j\psi_u}$ (u=1,2, ..., U).

Step S103: the test signal is calibrated by using an error calibration joint matrix of the MIMO wireless terminal so as to obtain a transmitting signal for testing.

Figure 5:
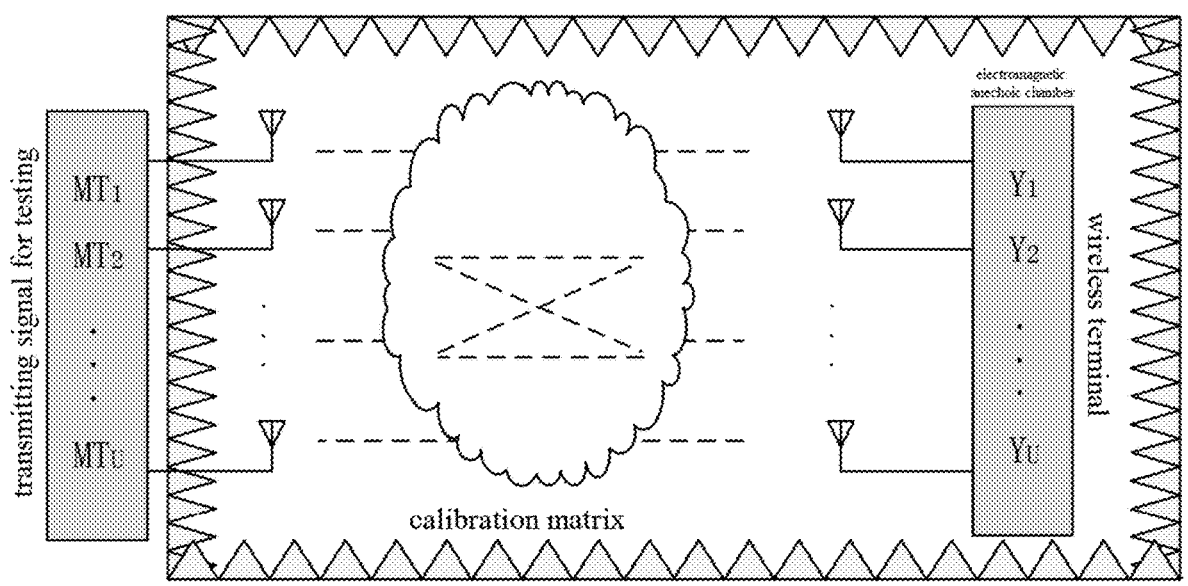
FIG. 5 is a schematic diagram of a calibration matrix.

Specifically, FIG. 5 is a schematic diagram of a calibration matrix. In the related art, a transmitting signal for testing is obtained by performing calibration only according to the calibration matrix shown in FIG. 5. In the related art, in a process of generating the transmitting signal for testing according to the calibration matrix and the obtained throughput test signal, U actual throughput test signals $$\begin{bmatrix} R|T_1 \\ R|T_2 \\ \vdots \\ R|T_U \end{bmatrix},$$

U transmitting signals $$\begin{bmatrix} MT_1 \\ MT_2 \\ \vdots \\ MT_U \end{bmatrix}$$

for testing, and the calibration matrix $$\begin{bmatrix} a_{11} & a_{12} & \ldots & a_{1U} \\ a_{21} & a_{22} & \ldots & a_{2U} \\ \vdots & \vdots & & \vdots \\ a_{U1} & a_{U2} & \ldots & a_{UU} \end{bmatrix}$$

satisfy the following relationship:

$$\begin{bmatrix} R|T_1 \\ R|T_2 \\ \vdots \\ R|T_U \end{bmatrix} = \begin{bmatrix} a_{11} & a_{12} & \ldots & a_{1U} \\ a_{21} & a_{22} & \ldots & a_{2U} \\ \vdots & \vdots & & \vdots \\ a_{U1} & a_{U2} & \ldots & a_{UU} \end{bmatrix} \begin{bmatrix} MT_1 \\ MT_2 \\ \vdots \\ MT_U \end{bmatrix}, \quad (6)$$

where a factor $a_{ij}$ of the calibration matrix is path multiplexing gain information from an input port of a $j^{th}$ transmitting antenna to an output port of an $i^{th}$ receiving antenna, and U is both the number of the receiving antennas and the number of the transmitting antennas.

In two-step radiation method of the related art, a relationship between signals $$\begin{bmatrix} R_1 \\ R_2 \\ \vdots \\ R_U \end{bmatrix}$$

finally received by the terminal receiver and the transmitting signals $$\begin{bmatrix} MT_1 \\ MT_2 \\ \vdots \\ MT_U \end{bmatrix}$$

for testing is:

$$\begin{bmatrix} R_1 \\ R_2 \\ \vdots \\ R_U \end{bmatrix} = \begin{bmatrix} a_{11} & a_{12} & \ldots & a_{1U} \\ a_{21} & a_{22} & \ldots & a_{2U} \\ \vdots & \vdots & & \vdots \\ a_{U1} & a_{U2} & \ldots & a_{UU} \end{bmatrix} \begin{bmatrix} MT_1 \\ MT_2 \\ \vdots \\ MT_U \end{bmatrix}. \quad (7)$$

From formulas (5), (6) and (7), it is obtainable that the signals $$\begin{bmatrix} R_1 \\ R_2 \\ \vdots \\ R_U \end{bmatrix}$$

finally received by the wireless terminal receiver are the actual throughput test signals $$\begin{bmatrix} R|T_1 \\ R|T_2 \\ \vdots \\ R|T_U \end{bmatrix},$$

that is:

$$\begin{bmatrix} R_1 \\ R_2 \\ \vdots \\ R_U \end{bmatrix} = \begin{bmatrix} R|T_1 \\ R|T_2 \\ \vdots \\ R|T_U \end{bmatrix} = R|H(t) \times \begin{bmatrix} B_1 \\ B_2 \\ \vdots \\ B_S \end{bmatrix}. \quad (8)$$

The above four steps are the description for principles of formulas in the two-step radiation method in the related art. It can be concluded from the formula (8) that: in the test of U×S MIMO wireless terminal performed by the two-step radiation method in the related art, the signal finally arrived at the wireless terminal contains the returning error information $E_u e^{j\psi_u}$(u=1,2, . . . , U) which seriously affects the accuracy of the MIMO test.

Embodiments of the present disclosure may eliminate the returning error and make the MIMO OTA test of the two-step radiation method more accurate. The principle thereof includes two parts as follows:

(I) Error Analysis

Regarding the existing two-step radiation method, for a U×S MOMO system, after the antenna pattern information of the plurality of antennas of the MIMO wireless terminal is obtained in the first step, and the complete MIMO transmission channel is simulated by fusing the antenna pattern information of the plurality of antennas of the wireless terminal and the preset MIMO channel propagation model so as to further generate the throughput test signal in the second step, the throughput test signal containing error can be obtained, i.e., the formula (5)

$$\begin{bmatrix} R|T_1 \\ R|T_2 \\ \vdots \\ R|T_U \end{bmatrix} = R|H(t) \times \begin{bmatrix} B_1 \\ B_2 \\ \vdots \\ B_S \end{bmatrix}. \tag{5}$$

According to the matrix multiplication theory and the formula $$\begin{bmatrix} F_u^{R_X(v)}(\Omega_l^{R_X}) \times E_u e^{j\psi_u} \\ F_u^{R_X(h)}(\Omega_l^{R_X}) \times E_u e^{j\psi_u} \end{bmatrix} = \begin{bmatrix} R|F_u^{R_X(v)}(\Omega_l^{R_X}) \\ R|F_u^{R_X(h)}(\Omega_l^{R_X}) \end{bmatrix}, \tag{1}$$

the formula (4) can be transformed into:

$$R|h_{u,s}(t) = \tag{9}$$

$$\sqrt{P_{us}} \lim_{K,L \to \infty} \frac{1}{\sqrt{KL}} \sum_{k=1}^{K} \sum_{l=1}^{L} g_{l,k} \exp(-jk_0(D_{sk} + D_{kl} + D_{lu}))$$

$$\exp(-jk_1 vt) \times \begin{bmatrix} F_s^{T_X(v)}(\Omega_k^{T_X}) \\ F_s^{T_X(h)}(\Omega_k^{T_X}) \end{bmatrix}^T \times$$

$$\begin{bmatrix} \exp(j\Phi_{l,k}^{(v,v)}) & \sqrt{k_{l,k}^h} \sqrt{\chi_{l,k}} \exp(j\Phi_{l,k}^{(v,h)}) \\ \sqrt{k_{l,k}^v} \exp(j\Phi_{l,k}^{(h,v)}) & \sqrt{\chi_{l,k}} \exp(j\Phi_{l,k}^{(h,h)}) \end{bmatrix} \times$$

$$\begin{bmatrix} F_u^{R_X(v)}(\Omega_l^{R_X}) \\ F_u^{R_X(h)}(\Omega_l^{R_X}) \end{bmatrix} \times E_u e^{j\psi_u}.$$

Then, $$R|h_{u,s}(t) = h_{u,s}(t) \times E_u e^{j\psi_u} \tag{10},$$

where $R|h_{u,s}(t)$ is the $(u,s)^{th}$ factor (u=1, 2, ..., U; s=1, 2, ..., S) in the channel correlation matrix $R|H(t)$ that contains the error.

Then, a relationship between $R|H(t)$ and $H(t)$ is $$R|H(t) = \begin{bmatrix} R|h_{1,1}(t) & R|h_{1,2}(t) & \cdots & R|h_{1,S}(t) \\ R|h_{2,1}(t) & R|h_{2,2}(t) & \cdots & R|h_{2,S}(t) \\ \vdots & \vdots & & \vdots \\ R|h_{U,1}(t) & R|h_{U,2}(t) & \cdots & R|h_{U,S}(t) \end{bmatrix} \tag{11}$$

$$= \begin{bmatrix} h_{1,1}(t)E_1 e^{j\psi_1} & h_{1,2}(t)E_1 e^{j\psi_1} & \cdots & h_{1,S}(t)E_1 e^{j\psi_1} \\ h_{2,1}(t)E_2 e^{j\psi_2} & h_{2,2}(t)E_2 e^{j\psi_2} & \cdots & h_{2,S}(t)E_2 e^{j\psi_2} \\ \vdots & \vdots & & \vdots \\ h_{U,1}(t)E_U e^{j\psi_U} & h_{U,2}(t)E_U e^{j\psi_U} & \cdots & h_{U,S}(t)E_U e^{j\psi_U} \end{bmatrix}$$

$$= \begin{bmatrix} E_1 e^{j\psi_1} & 0 & \cdots & 0 \\ 0 & E_2 e^{j\psi_2} & \cdots & 0 \\ \vdots & \vdots & & \vdots \\ 0 & 0 & \cdots & E_U e^{j\psi_U} \end{bmatrix}$$

-continued $$\begin{bmatrix} h_{1,1}(t) & h_{1,2}(t) & \cdots & h_{1,S}(t) \\ h_{2,1}(t) & h_{2,2}(t) & \cdots & h_{2,S}(t) \\ \vdots & \vdots & & \vdots \\ h_{U,1}(t) & h_{U,2}(t) & \cdots & h_{U,S}(t) \end{bmatrix}$$

$$= \begin{bmatrix} E_1 e^{j\psi_1} & 0 & \cdots & 0 \\ 0 & E_2 e^{j\psi_2} & \cdots & 0 \\ \vdots & \vdots & & \vdots \\ 0 & 0 & \cdots & E_U e^{j\psi_U} \end{bmatrix} \times H(t).$$

If an error matrix E is defined to $$E = \begin{bmatrix} E_1 e^{j\psi_1} & 0 & \cdots & 0 \\ 0 & E_2 e^{j\psi_2} & \cdots & 0 \\ \vdots & \vdots & & \vdots \\ 0 & 0 & \cdots & E_U e^{j\psi_U} \end{bmatrix}, \tag{12}$$

a relationship between $R|H(t)$ and $H(t)$ is $$R|H(t) = E \times H(t) \tag{13}.$$

Then, the U actual throughput test signals $$\begin{bmatrix} R|T_1 \\ R|T_2 \\ \vdots \\ R|T_U \end{bmatrix}$$

and S signals $$\begin{bmatrix} B_1 \\ B_2 \\ \vdots \\ B_S \end{bmatrix}$$

sent from base station may be expressed as $$\begin{bmatrix} R|T_1 \\ R|T_2 \\ \vdots \\ R|T_U \end{bmatrix} = R|H(t) \times \begin{bmatrix} B_1 \\ B_2 \\ \vdots \\ B_S \end{bmatrix} = E \times H(t) \times \begin{bmatrix} B_1 \\ B_2 \\ \vdots \\ B_S \end{bmatrix}, \tag{14}$$

and an error is still contained in the signal.

(II) Error Elimination

After obtaining the throughput test signals, the calibration matrix for the DUT in the anechoic chamber is determined according to the relative position and orientation of the DUT to the measurement antenna in the anechoic chamber. New transmitting signals for testing are generated according to the calibration matrix, the obtained throughput test signals and the error matrix. That is, the test signals are calibrated by using the error calibration joint matrix of the MIMO wireless terminal to obtain transmitting signals for testing. Detailed descriptions are as follows.

New transmitting signals $$\begin{bmatrix} NT_1 \\ NT_2 \\ \vdots \\ NT_U \end{bmatrix}$$

for testing, the U actual throughput test signals $$\begin{bmatrix} R|T_1 \\ R|T_2 \\ \vdots \\ R|T_U \end{bmatrix},$$

the calibration matrix $$\begin{bmatrix} a_{11} & a_{12} & \ldots & a_{1U} \\ a_{21} & a_{22} & \ldots & a_{2U} \\ \vdots & \vdots & & \vdots \\ a_{U1} & a_{U2} & \ldots & a_{UU} \end{bmatrix}$$

and the error matrix $$\begin{bmatrix} E_1 e^{j\psi_1} & 0 & \ldots & 0 \\ 0 & E_2 e^{j\psi_2} & \ldots & 0 \\ \vdots & \vdots & & \vdots \\ 0 & 0 & \ldots & E_U e^{j\psi_U} \end{bmatrix}$$

are allowed to satisfy the following equation:

$$\begin{bmatrix} R|T_1 \\ R|T_2 \\ \vdots \\ R|T_U \end{bmatrix} = \begin{bmatrix} E_1 e^{j\psi_1} & 0 & \ldots & 0 \\ 0 & E_2 e^{j\psi_2} & \ldots & 0 \\ \vdots & \vdots & & \vdots \\ 0 & 0 & \ldots & E_U e^{j\psi_U} \end{bmatrix} \begin{bmatrix} a_{11} & a_{12} & \ldots & a_{1U} \\ a_{21} & a_{22} & \ldots & a_{2U} \\ \vdots & \vdots & & \vdots \\ a_{U1} & a_{U2} & \ldots & a_{UU} \end{bmatrix} \begin{bmatrix} NT_1 \\ NT_2 \\ \vdots \\ NT_U \end{bmatrix}, \quad (15)$$

where the factor $a_{ij}$ of the calibration matrix is the path multiplexing gain from the input port of the $j^{th}$ transmitting antenna to the output port of the $i^{th}$ receiving antenna.

Here, the key point is how to obtain the new transmitting signals $$\begin{bmatrix} NT_1 \\ NT_2 \\ \vdots \\ NT_U \end{bmatrix}$$

for testing. Although the equation (15) gives the relationship among the actual throughput test signals, the error matrix, the calibration matrix and the new transmitting signals for testing, in fact, as has already been stated above, in the OTA test mode, the returning error cannot be obtained, that is, the error matrix E cannot be obtained separately, and therefore $$\begin{bmatrix} NT_1 \\ NT_2 \\ \vdots \\ NT_U \end{bmatrix}$$

cannot be obtained by simple calculation. One of the key points of the present disclosure is to obtain the new transmitting signals $$\begin{bmatrix} NT_1 \\ NT_2 \\ \vdots \\ NT_U \end{bmatrix}$$

for testing. This process will be described in detail below.

The error calibration joint matrix EA is expressed as formula (16):

$$EA = \begin{bmatrix} E_1 e^{j\psi_1} & 0 & \ldots & 0 \\ 0 & E_2 e^{j\psi_2} & \ldots & 0 \\ \vdots & \vdots & & \vdots \\ 0 & 0 & \ldots & E_U e^{j\psi_U} \end{bmatrix} \begin{bmatrix} a_{11} & a_{12} & \ldots & a_{1U} \\ a_{21} & a_{22} & \ldots & a_{2U} \\ \vdots & \vdots & & \vdots \\ a_{U1} & a_{U2} & \ldots & a_{UU} \end{bmatrix}. \quad (16)$$

After further transformation, the error calibration joint matrix EA is expressed as formula (17):

$$EA = \begin{bmatrix} a_{11} E_1 e^{j\psi_1} & a_{12} E_1 e^{j\psi_1} & \ldots & a_{1U} E_1 e^{j\psi_1} \\ a_{21} E_2 e^{j\psi_2} & a_{22} E_2 e^{j\psi_2} & \ldots & a_{2U} E_2 e^{j\psi_2} \\ \vdots & \vdots & & \vdots \\ a_{U1} E_U e^{j\psi_U} & a_{U2} E_U e^{j\psi_U} & \ldots & a_{UU} E_U e^{j\psi_U} \end{bmatrix}, \quad (17)$$

where a factor $a_{ij} E_i e^{j\psi_i}$ (i,j=1,2, ..., U) the error calibration joint matrix is obtained by calculation, and the specific calculation process is as follows.

Firstly, a signal with a power $P_{emj}$ is transmitted through the $j^{th}$ transmitting antenna; further, a power and phase returning value $RS_{ij}$ received at the output port of the $i^{th}$ receiving antenna is obtained, then the power and phase returning value $RS_{ij}$ is divided by the power $P_{emj}$ to obtain the $a_{ij} E_i e^{j\psi_i}$, that is, $$a_{ij} E_i e^{j\psi_i} = RS_{ij}/P_{emj} \quad (18)$$

Therefore, the error calibration joint matrix as shown below is obtained:

$$EA = \begin{bmatrix} RS_{11}/P_{em1} & RS_{12}/P_{em2} & \ldots & RS_{1U}/P_{emU} \\ RS_{21}/P_{em1} & RS_{22}/P_{em2} & \ldots & RS_{2U}/P_{emU} \\ \vdots & \vdots & & \vdots \\ RS_{U1}/P_{em1} & RS_{U2}/P_{em2} & \ldots & RS_{UU}/P_{emU} \end{bmatrix}. \quad (19)$$

After the error calibration joint matrix EA is obtained by calculation, the transmitting signals $$\begin{bmatrix} NT_1 \\ NT_2 \\ \vdots \\ NT_U \end{bmatrix}$$

for testing can be obtained by the following formula:

$$\begin{bmatrix} RS_{11}/P_{em1} & RS_{12}/P_{em2} & \cdots & RS_{1U}/P_{emU} \\ RS_{21}/P_{em1} & RS_{22}/P_{em2} & \cdots & RS_{2U}/P_{emU} \\ \vdots & \vdots & & \vdots \\ RS_{U1}/P_{em1} & RS_{U2}/P_{em2} & \cdots & RS_{UU}/P_{emU} \end{bmatrix} \begin{bmatrix} NT_1 \\ NT_2 \\ \vdots \\ NT_U \end{bmatrix} = \begin{bmatrix} R|T_1 \\ R|T_2 \\ \vdots \\ R|T_U \end{bmatrix}. \quad (20)$$

For convenience of calculation, $P_{emj}$ may be the same value, such as, all of the $P_{emj}$ may be 1, that is, 0 dB signal is transmitted.

Step S104: the transmitting signals for testing are fed into a plurality of measurement antennas of the electromagnetic anechoic chamber and transmitted to the wireless terminal through the measurement antennas so as to test the wireless terminal.

Specifically, the transmitting signals $$\begin{bmatrix} NT_1 \\ NT_2 \\ \vdots \\ NT_U \end{bmatrix}$$

for testing are fed into the plurality of measurement antennas in the electromagnetic anechoic chamber and transmitted to the wireless terminal through the measurement antenna so as to test the wireless terminal.

A relationship between signals $$\begin{bmatrix} NR_1 \\ NR_2 \\ \vdots \\ NR_U \end{bmatrix}$$

finally received by the terminal receiver and new transmitting signals for testing is:

$$\begin{bmatrix} NR_1 \\ NR_2 \\ \vdots \\ NR_U \end{bmatrix} = \begin{bmatrix} a_{11} & a_{12} & \cdots & a_{1U} \\ a_{21} & a_{22} & \cdots & a_{2U} \\ \vdots & \vdots & & \vdots \\ a_{U1} & a_{U2} & \cdots & a_{UU} \end{bmatrix} \begin{bmatrix} NT_1 \\ NT_2 \\ \vdots \\ NT_U \end{bmatrix}. \quad (21)$$

According to formulas (14), (15) and (21), finally, a relationship between the signals received by the wireless terminal receiver and the signals sent from the base station is:

$$\begin{bmatrix} NR_1 \\ NR_2 \\ \vdots \\ NR_U \end{bmatrix} = H(t) \times \begin{bmatrix} B_1 \\ B_2 \\ \vdots \\ B_S \end{bmatrix}. \quad (22)$$

It can be seen from formula (22) that the signals finally arrived at the receiver do not contain the returning error, thus accurately achieving the MIMO OTA test by the two-step radiation method.

It should be noted that if the throughputs of the MIMO terminal in a mode of a head phantom or a hand phantom or in a hand-held mode are to be tested, the placement states of the MIMO terminal should be consistent in steps S101 and S104, such that the pattern of the receiving antenna obtained in step S101 can be used in the later throughput test. If the placement states of the terminal under test are not consistent, the pattern of the receiving antenna may change.

In an embodiment of the present disclosure, during the process of the test step D, the measurement antenna and the wireless terminal remain stationary. During the process of the throughput test, the DUT remains stationary and does not rotate, the MIMO terminal receives signals in different directions, which are simulated by a channel simulator.

Likewise, in steps S101 and S104, the placement states of the measurement antenna are also the same. In an embodiment of the present disclosure, the measurement antenna may remain stationary.

In addition, the electromagnetic anechoic chambers used in steps S101 and S104 are same.

In another embodiment of the present disclosure, some measurement antennas among the plurality of measurement antennas are horizontally polarized antennas, and other measurement antennas among the plurality of measurement antennas are vertically polarized antennas. For example, one of the two transmitting antennas may be a horizontally polarized measurement antenna, and the other one may be a vertically polarized measurement antenna. Correspondingly, the gain of the receiving antenna used may also be required to correspond to the polarization of the measurement antenna when a measurement channel transfer matrix and an inverse matrix of the measurement channel transfer matrix are calculated.

A plurality of measurement antennas are arranged in the anechoic chamber, and the number n of measurement antennas is greater than or equal to the number m of receiving antennas of the MIMO terminal. In an embodiment of the present disclosure, the number of measurement antennas is equal to the number of receiving antennas of the MIMO terminal.

To clearly illustrate embodiments of the present disclosure, in this embodiment, a possible application scenario is provided. In combination with a 2×2 MIMO system, the method for testing the wireless performance is specifically described.

Firstly, an antenna pattern of the 2×2 MIMO wireless terminal is obtained.

Specifically, a relationship between the pattern information obtained and the actual pattern information of the MIMO wireless terminal is:

$$\begin{bmatrix} F_u^{R_X(v)}(\Omega_l^{R_X}) \times E_u e^{j\psi_u} \\ F_u^{R_X(h)}(\Omega_l^{R_X}) \times E_u e^{j\psi_u} \end{bmatrix} = \begin{bmatrix} R|F_u^{R_X(v)}(\Omega_l^{R_X}) \\ R|F_u^{R_X(h)}(\Omega_l^{R_X}) \end{bmatrix},$$

where $F_u^{Rx(v)}(\Omega_l^{Rx})$ is a true value of v-polarization multiplexing gain of the $u^{th}$ (u=1,2) receiving antenna; $F_u^{Rx(h)}(\Omega_l^{Rx})$ is a true value of h-polarization multiplexing gain of the $u^{th}$ (u=1,2) receiving antenna; $R|F_u^{Rx(v)}(\Omega_l^{Rx})$ is an actual measurement value of v-polarization multiplexing gain of the $u^{th}$ (u=1,2) receiving antenna; $R|F_u^{Rx(h)}(\Omega_l^{Rx})$ is an actual measurement value of h-polarization multiplexing gain of the $u^{th}$ (u=1,2) receiving antenna; $E_u e^{j\psi_u}$ is an error of the $u^{th}$ (u=1,2) receiving antenna which is introduced by the returning system, $E_u$ represents the corresponding amplitude measurement error, and $e^{j\psi_u}$ represents the corresponding phase measurement error.

Further, a throughput test signal is generated by using the antenna pattern obtained and a channel model that.

For the 2×2 MIMO system, theoretically, a relationship between signals $$\begin{bmatrix} B_1 \\ B_2 \end{bmatrix}$$

sent from the base station and throughput test signals $$\begin{bmatrix} R|T_1 \\ R|T_2 \end{bmatrix}$$

should satisfy:

$$\begin{bmatrix} R|T_1 \\ R|T_2 \end{bmatrix} = R|H(t) \times \begin{bmatrix} B_1 \\ B_2 \end{bmatrix} = E \times H(t) \times \begin{bmatrix} B_1 \\ B_2 \end{bmatrix}, \quad (23)$$

where $R|H(t)$ is a channel correlation matrix, the $(u,s)^{th}$ factor (u=1, 2; s=1, 2) takes values as follow:

$$R|h_{u,s}(t) = \quad (24)$$

$$\sqrt{P_{us}} \lim_{K,L \to \infty} \frac{1}{\sqrt{KL}} \sum_{k=1}^{K} \sum_{l=1}^{L} g_{l,k} \exp(-jk_0(D_{sk} + D_{kl} + D_{lu}))$$

$$\exp(-jk_1 vt) \times \begin{bmatrix} F_s^{Tx(v)}(\Omega_k^{Tx}) \\ F_s^{Tx(h)}(\Omega_k^{Tx}) \end{bmatrix}^T \times$$

$$\begin{bmatrix} \exp(j\Phi_{l,k}^{(v,v)}) & \sqrt{k_{l,k}^h}\sqrt{\chi_{l,k}}\exp(j\Phi_{l,k}^{(v,h)}) \\ \sqrt{k_{l,k}^v}\exp(j\Phi_{l,k}^{(h,v)}) & \sqrt{\chi_{l,k}}\exp(j\Phi_{l,k}^{(h,h)}) \end{bmatrix} \times$$

$$\begin{bmatrix} R|F_u^{Rx(v)}(\Omega_l^{Rx}) \\ R|F_u^{Rx(h)}(\Omega_l^{Rx}) \end{bmatrix},$$

where $P_{us}$ represents a power transmitted through a diameter $T_{X_s}$–$R_{X_u}$; $g_{l,k}$ and $\Phi_{l,k}^{(x,y)}$ are power and phase shifts between V (H) polarization of a transmitting antenna and V (H) polarization of the receiving antenna caused by scatterers $TS_k$ and $RS_l$; $D_{sk}$ is a distance from the scatterer $TS_k$ to an $s^{th}$ transmitting antenna $T_{X_s}$; $D_{lu}$ is a distance from the scatterer $RS_l$ to the $u^{th}$ receiving antenna $R_{X_u}$; $D_{kl}$ is a distance from the scatterer $TS_k$ to the scatterer $RS_l$; $F_s^{Tx(v)}(\Omega_k^{Tx})$ is multiplexing gain information of the $s^{th}$ transmitting antenna $T_{X_s}$ at v polarization and an $\Omega_k^{Tx}$ angle; $F_s^{Tx(h)}(\Omega_k^{Tx})$ is multiplexing gain information of the $s^{th}$ transmitting antenna $T_{X_s}$ at h polarization and the $\Omega_k^{Tx}$ angle; $F_u^{Rx(v)}(\Omega_l^{Rx})$ is true and accurate multiplexing gain information of the $u^{th}$ receiving antenna $R_{X_u}$ at v polarization and the $\Omega_l^{Rx}$ angle; $F_u^{Rx(h)}(\Omega_l^{Rx})$ is true and accurate multiplexing gain information of the $u^{th}$ receiving antenna $R_{X_u}$ at h polarization and the $\Omega_l^{Rx}$ angle; $k_{l,k}^v$ and $k_{l,k}^h$ represent XPD of the channel model; $\chi_{l,k}$ represents CPR of the channel model; $\lambda$ represents a wavelength; and $k_1$ represents a propagation direction.

Further, an error calibration joint matrix for the MIMO wireless terminal in the electromagnetic anechoic chamber is determined according to the returning information of the MIMO wireless terminal, and then a transmitting signal for testing is generated according to the error calibration joint matrix and the throughput test signal that has been calculated.

Figure 6:
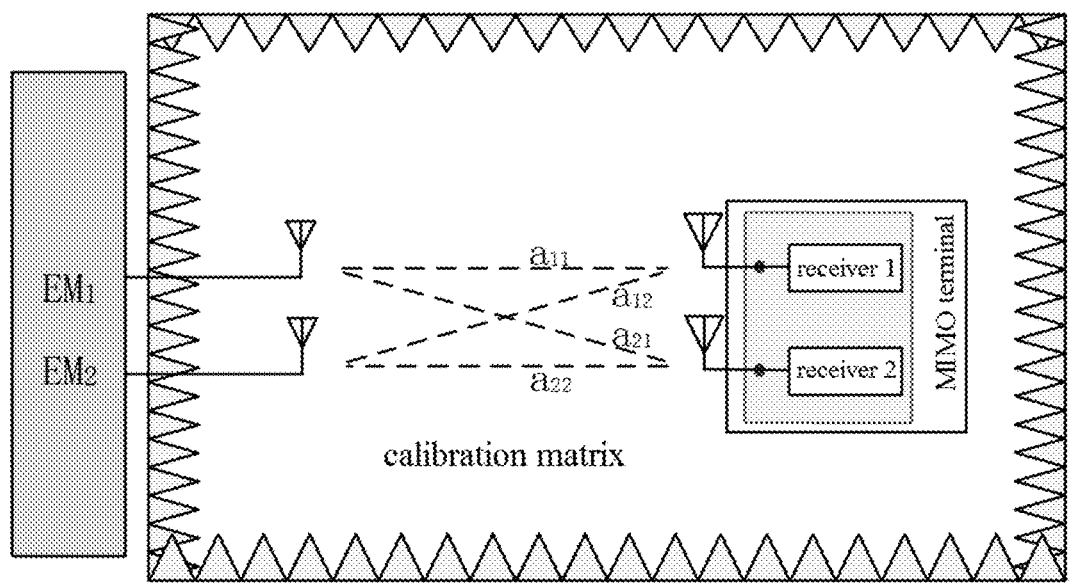
FIG. 6 is a schematic diagram for illustrating how to obtain an error calibration joint matrix in a 2×2 MIMO system.

FIG. 6 is a schematic diagram for illustrating how to obtain an error calibration joint matrix in a 2×2 MIMO system. The error calibration joint matrix is set to:

$$EA = \begin{bmatrix} EA_{11} & EA_{12} \\ EA_{21} & EA_{22} \end{bmatrix}.$$

A signal EM1 is turned on, an output power is set to be $P_{em1}$, a signal EM2 is turned off, returning values of the amplitude and phase of signals received by each receiver are obtained, the returning value of the receiver 1 is recorded as $RS_{11}$ and the returning value of the receiver 2 is recorded as $RS_{21}$, where both $RS_{11}$ and $RS_{21}$ are complex numbers and contain the gain and phase value.

Then, two variables in the 2×2 error calibration joint matrix are:

$$EA_{11} = RS_{11}/P_{em1};$$

$$EA_{21} = RS_{21}/P_{em1}.$$

The signal EM2 is turned on, the output power is set to be $P_{em2}$, the signal EM1 is turned off, the returning values of the amplitude and phase of the signals received by each receiver are obtained, the returning value of the receiver 1 is recorded as $RS_{12}$ and the returning value of the receiver 2 is recorded as $RS_{22}$, where both $RS_{12}$ and $RS_{22}$ are complex numbers and contain the gain and phase value.

Then, the other two variables in the 2×2 error calibration joint matrix are:

$$EA_{12} = RS_{12}/P_{em2};$$

$$EA_{22} = RS_{22}/P_{em2}.$$

Based on the above four variables, the error calibration joint matrix finally solved is:

$$EA = \begin{bmatrix} RS_{11}/P_{em1} & RS_{12}/P_{em2} \\ RS_{21}/P_{em1} & RS_{22}/P_{em2} \end{bmatrix}. \quad (25)$$

The transmitting signals $$\begin{bmatrix} NT_1 \\ NT_2 \end{bmatrix}$$

for testing solved according to the error calibration joint matrix EA and the throughput test signals $$\begin{bmatrix} R|T_1 \\ R|T_2 \end{bmatrix}$$

satisfy the following relationship:

$$\begin{bmatrix} RS_{11}/P_{em1} & RS_{12}/P_{em2} \\ RS_{21}/P_{em1} & RS_{22}/P_{em2} \end{bmatrix} \begin{bmatrix} NT_1 \\ NT_2 \end{bmatrix} = \begin{bmatrix} R|T_1 \\ R|T_2 \end{bmatrix}. \quad (26)$$

Figure 7:
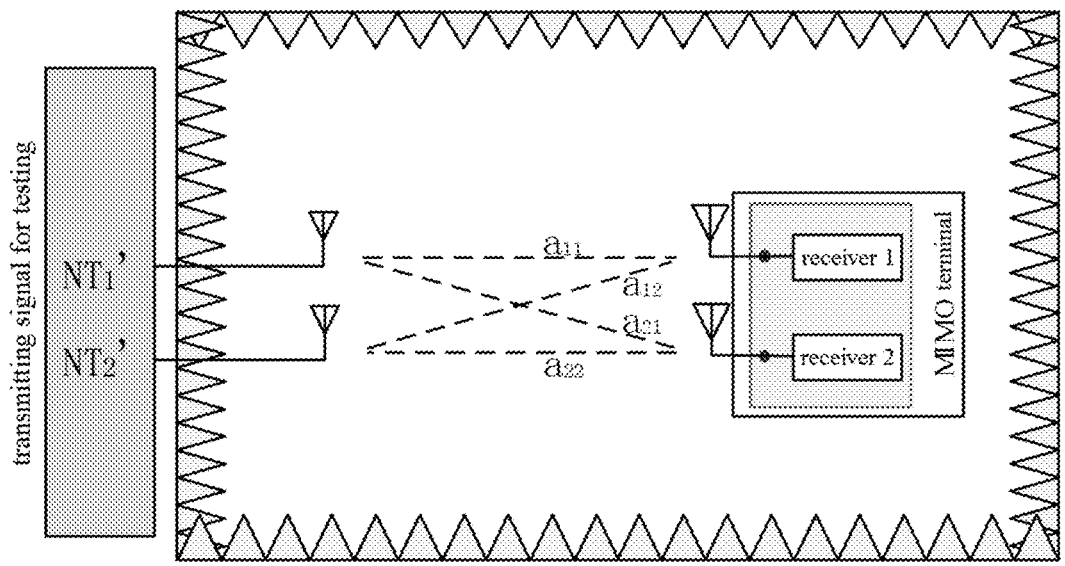
FIG. 7 is a schematic diagram of testing a wireless terminal through measurement antennas.

Finally, the transmitting signals $$\begin{bmatrix} NT_1 \\ NT_2 \end{bmatrix}$$

for testing are fed into the plurality of measurement antennas in the electromagnetic anechoic chamber and transmitted to the MIMO wireless terminal through the measurement antennas as shown in FIG. 7 to test the wireless terminal.

FIG. 7 is a schematic diagram of testing a wireless terminal through measurement antennas. As shown in FIG. 7, the transmitting signals $$\begin{bmatrix} NT_1 \\ NT_2 \end{bmatrix}$$

for testing are fed into the plurality of measurement antennas in the electromagnetic anechoic chamber, and a relationship between signals $$\begin{bmatrix} R_1 \\ R_2 \end{bmatrix}$$

finally received by the terminal receiver and new transmission signals for testing is:

$$\begin{bmatrix} R_1 \\ R_2 \end{bmatrix} = \begin{bmatrix} a_{11} & a_{12} \\ a_{21} & a_{22} \end{bmatrix} \begin{bmatrix} NT_1 \\ NT_2 \end{bmatrix}, \quad (27)$$

where the factor aij of the calibration matrix is a path multiplexing gain from an input port of a $j^{th}$ transmitting antenna to an output port of an $i^{th}$ receiving antenna.

According to the following formulas:

$$\begin{bmatrix} R|T_1 \\ R|T_2 \end{bmatrix} = R|H(t) \times \begin{bmatrix} B_1 \\ B_2 \end{bmatrix} = E \times H(t) \times \begin{bmatrix} B_1 \\ B_2 \end{bmatrix};$$

$$EA = \begin{bmatrix} RS_{11}/P_{em1} & RS_{12}/P_{em2} \\ RS_{21}/P_{em1} & RS_{22}/P_{em2} \end{bmatrix};$$

$$\begin{bmatrix} RS_{11}/P_{em1} & RS_{12}/P_{em2} \\ RS_{21}/P_{em1} & RS_{22}/P_{em2} \end{bmatrix} \begin{bmatrix} NT_1 \\ NT_2 \end{bmatrix} = \begin{bmatrix} R|T_1 \\ R|T_2 \end{bmatrix}; \text{ and}$$

$$\begin{bmatrix} R_1 \\ R_2 \end{bmatrix} = \begin{bmatrix} a_{11} & a_{12} \\ a_{21} & a_{22} \end{bmatrix} \begin{bmatrix} NT_1 \\ NT_2 \end{bmatrix},$$

the signals $$\begin{bmatrix} R_1 \\ R_2 \end{bmatrix}$$

received by the receiver of the wireless terminal are calculated to obtain a relationship between the signals $$\begin{bmatrix} R_1 \\ R_2 \end{bmatrix}$$

received by the receiver of the wireless terminal and the signals sent from the base station:

$$\begin{bmatrix} R_1 \\ R_2 \end{bmatrix} = H(t) \times \begin{bmatrix} B_1 \\ B_2 \end{bmatrix}. \quad (28)$$

It may be seen from the above formula that the signals finally arrived at the receiver do not contain the error, thus realizing the MIMO OTA test by two-step radiation method accurately.

The method for testing wireless performance of a MIMO wireless terminal includes: obtaining the antenna pattern information of the plurality of antennas of the MIMO wireless terminal tested in the electromagnetic anechoic chamber; further obtaining the test signal according to the antenna pattern information of the MIMO wireless terminal; calibrating the test signal by using the error calibration joint matrix of the MIMO wireless terminal so as to obtain the transmitting signal for testing; and finally feeding the transmitting signal for testing into the plurality of measurement antennas of the electromagnetic anechoic chamber and transmitting the transmitting signal to the wireless terminal through the measurement antennas so as to test the wireless terminal. As the transmitting signal for testing is obtained by calibrating the test signal with the error calibration joint matrix of the MIMO wireless terminal, a test error is eliminated, thus solving a technical problem in the related art that the test error cannot be quantified such that the accuracy and repeatability for testing the MIMO wireless terminal are affected.

In embodiments of a second aspect of the present disclosure, there is provided a device for testing wireless performance of a MIMO wireless terminal, including:

a processor; and a memory for storing instructions executable by the processor;

wherein the processor is configured to:

A. obtain antenna pattern information of the plurality of antennas of the MIMO wireless terminal;

B. obtain a test signal according to the antenna pattern information of the MIMO wireless terminal;

C. calibrate the test signal by using an error calibration joint matrix of the MIMO wireless terminal so as to obtain a transmitting signal for testing;

D. feed the transmitting signal for testing into a plurality of measurement antennas of the electromagnetic anechoic chamber and transmit the transmitting signal to the wireless terminal through the measurement antennas so as to test the wireless terminal.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "an embodiment", "another example," "an example," "a specific example," or "some examples," means that a particular feature, structure, material, or characteristic described in connection with the embodiment or example is included in at least an embodiment or example of the present disclosure. Thus, the appearances of the phrases such as "in some embodiments," "in an embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications may be made in the embodiments without departing from spirit, principles and scope of the present disclosure.

What is claimed is:

1. A method for testing wireless performance of a Multiple-Input Multiple-Output (MIMO) wireless terminal, wherein the MIMO wireless terminal has a plurality of antennas and is placed in an electromagnetic anechoic chamber, the method comprising:
   A. obtaining antenna pattern information of the plurality of antennas of the MIMO wireless terminal;
   B. obtaining a test signal according to the antenna pattern information of the MIMO wireless terminal;
   C. calibrating the test signal by using an error calibration joint matrix of the MIMO wireless terminal so as to obtain a transmitting signal for testing;
   D. feeding the transmitting signal for testing into a plurality of measurement antennas of the electromagnetic anechoic chamber and transmitting the transmitting signal to the wireless terminal through the measurement antennas so as to test the wireless terminal.

2. The method of claim 1, wherein the error calibration joint matrix is determined according to returning information of an amplitude and phase difference returning system of the MIMO wireless terminal.

3. The method of claim 2, wherein the error calibration joint matrix EA is a product of an error matrix E and a calibration matrix A;

wherein the error matrix E is $$\begin{bmatrix} E_1 e^{j\psi_1} & 0 & \cdots & 0 \\ 0 & E_2 e^{j\psi_2} & \cdots & 0 \\ \vdots & \vdots & & \vdots \\ 0 & 0 & \cdots & E_U e^{j\psi_U} \end{bmatrix};$$

where $E_u e^{j\psi_u}$ is a test error of a $u^{th}$ (u≥1) receiving antenna, and the test error is introduced by the amplitude and phase difference returning system, $E_u$ is an amplitude measurement error, and $e^{j\psi_u}$ is a phase measurement error;

the calibration matrix A is $$\begin{bmatrix} a_{11} & a_{12} & \ldots & a_{1U} \\ a_{21} & a_{22} & \ldots & a_{2U} \\ \vdots & \vdots & & \vdots \\ a_{U1} & a_{U2} & \ldots & a_{UU} \end{bmatrix},$$

where a factor $a_{ij}$ of the calibration matrix is path multiplexing gain information from an input port of a $j^{th}$ transmitting antenna to an output port of an $i^{th}$ receiving antenna.

4. The method of claim 3, wherein a factor of the error calibration joint matrix is $a_{ij} E_i e^{j\psi i}$ (i, j=1,2, . . . , U); where $a_{ij}E_i e^{j\psi i}$ satisfies the following relation:

$$a_{ii} E_i e^{j\psi i} = RS_{ij}/P_{emj};$$

where $P_{emj}$ is an transmitting power of a signal transmitted by the $k^{th}$ transmitting antenna, and $RS_{ij}$ is a returning value of the power and the phase received by the output port of the $i^{th}$ receiving antenna.

5. The method of claim 1, wherein obtaining a test signal according to the antenna pattern information of the MIMO wireless terminal comprises:
generating the test signal by fusing the antenna pattern information of the MIMO wireless terminal and a preset MIMO signal propagation model.

6. The method of claim 1, wherein the antenna pattern information comprises gain information in a plurality of directions and/or phase difference information of any two antennas receiving the same information in a plurality of directions.

7. The method of claim 1, wherein the number of the measurement antennas in the electromagnetic anechoic chamber is greater than or equal to the number of antennas of the wireless terminal.

8. The method of claim 1, wherein the measurement antenna and the wireless terminal remain stationary in step D.

9. The method of claim 1, wherein the test is a throughput test.

10. The method of claim 1, wherein obtaining antenna pattern information of the plurality of antennas of the MIMO wireless terminal comprises:
measuring the antenna pattern information of the plurality of antennas of the MIMO wireless terminal in the electromagnetic anechoic chamber; the electromagnetic anechoic chambers used in step A and step D are the same.

11. The method of claim 1, wherein some measurement antennas among the plurality of measurement antennas are horizontally polarized antennas, and other measurement antennas among the plurality of measurement antennas are vertically polarized antennas.

12. The method according to claim 1, wherein a number of the measurement antennas is 2, a number of the receiving antennas of the MIMO wireless terminal is 2;
the error calibration joint matrix is $$EA = \begin{bmatrix} EA_{11} & EA_{12} \\ EA_{21} & EA_{22} \end{bmatrix};$$

where $EA_{11}=RS_{11}/P_{em1}$, $EA_{21}=RS_{21}/P_{em1}$, $EA_{12}=RS_{12}/P_{em2}$ $EA_{22}=RS_{22}P_{em2}$;

$RS_{11}$ is a returning value of a power and a phase received by an output port of a first receiving antenna when a first measurement antenna transmits a signal EM1 with a transmitting power $P_{em1}$;

$RS_{21}$ is a returning value of a power and a phase received by an output port of a second receiving antenna when the first measurement antenna transmits the signal EM1 with the transmitting power $P_{em1}$;

$RS_{12}$ is a returning value of the power and the phase received by the output port of the first receiving antenna when a second measurement antenna transmits a signal EM2 with a transmitting power $P_{em2}$;

$RS_{22}$ is a returning value of the power and the phase received by the output port of the second receiving antenna when the second measurement antenna transmits the signal EM2 with the transmitting power $P_{em2}$.

13. The method according to claim 2, wherein a number of the measurement antennas is 2, a number of the receiving antennas of the MIMO wireless terminal is 2;
the error calibration joint matrix is $$EA = \begin{bmatrix} EA_{11} & EA_{12} \\ EA_{21} & EA_{22} \end{bmatrix};$$

where $EA_{11}=RS_{11}/P_{em1}$, $EA_{21}=RS_{21}/P_{em1}$, $EA_{12}=RS_{12}/P_{em2}$ $EA_{22}=RS_{22}P_{em2}$;

$RS_{11}$ is a returning value of a power and a phase received by an output port of a first receiving antenna when a first measurement antenna transmits a signal EM1 with a transmitting power $P_{em1}$;

$RS_{21}$ is a returning value of a power and a phase received by an output port of a second receiving antenna when the first measurement antenna transmits the signal EM1 with the transmitting power $P_{em1}$;

$RS_{12}$ is a returning value of the power and the phase received by the output port of the first receiving antenna when a second measurement antenna transmits a signal EM2 with a transmitting power $P_{em2}$;

$RS_{22}$ is a returning value of the power and the phase received by the output port of the second receiving antenna when the second measurement antenna transmits the signal EM2 with the transmitting power $P_{em2}$.

14. The method according to claim 3, wherein a number of the measurement antennas is 2, a number of the receiving antennas of the MIMO wireless terminal is 2;
the error calibration joint matrix is $$EA = \begin{bmatrix} EA_{11} & EA_{12} \\ EA_{21} & EA_{22} \end{bmatrix};$$

where $EA_{11}=RS_{11}/P_{em1}$, $EA_{21}=RS_{21}/P_{em1}$, $EA_{12}=RS_{12}/P_{em2}$ $EA_{22}=RS_{22}P_{em2}$;

$RS_{11}$ is a returning value of a power and a phase received by an output port of a first receiving antenna when a first measurement antenna transmits a signal EM1 with a transmitting power $P_{em1}$;

$RS_{21}$ is a returning value of a power and a phase received by an output port of a second receiving antenna when the first measurement antenna transmits the signal EM1 with the transmitting power $P_{em1}$;

$RS_{12}$ is a returning value of the power and the phase received by the output port of the first receiving antenna when a second measurement antenna transmits a signal EM2 with a transmitting power $P_{em2}$;

$RS_{22}$ is a returning value of the power and the phase received by the output port of the second receiving antenna when the second measurement antenna transmits the signal EM2 with the transmitting power $P_{em2}$.

15. The method according to claim 4, wherein a number of the measurement antennas is 2, a number of the receiving antennas of the MIMO wireless terminal is 2;

the error calibration joint matrix is $$EA = \begin{bmatrix} EA_{11} & EA_{12} \\ EA_{21} & EA_{22} \end{bmatrix};$$

where $EA_{11}=RS_{11}/P_{em1}$, $EA_{21}=RS_{21}P_{em1}$ $EA_{12}=RS_{12}P_{em2}$ $EA_{22}=RS_{22}P_{em2}$;

$RS_{11}$ is a returning value of a power and a phase received by an output port of a first receiving antenna when a first measurement antenna transmits a signal EM1 with a transmitting power $P_{em1}$;

$RS_{21}$ is a returning value of a power and a phase received by an output port of a second receiving antenna when the first measurement antenna transmits the signal EM1 with the transmitting power $P_{em1}$;

$RS_{12}$ is a returning value of the power and the phase received by the output port of the first receiving antenna when a second measurement antenna transmits a signal EM2 with a transmitting power $P_{em2}$;

$RS_{22}$ is a returning value of the power and the phase received by the output port of the second receiving antenna when the second measurement antenna transmits the signal EM2 with the transmitting power $P_{em2}$.

16. A device for testing wireless performance of a Multiple-Input Multiple-Output (MIMO) wireless terminal, comprising:

a processor; and a memory for storing instructions executable by the processor;

wherein the processor is configured to:

A. obtain antenna pattern information of the plurality of antennas of the MIMO wireless terminal;

B. obtain a test signal according to the antenna pattern information of the MIMO wireless terminal;

C. calibrate the test signal by using an error calibration joint matrix of the MIMO wireless terminal so as to obtain a transmitting signal for testing;

D. feed the transmitting signal for testing into a plurality of measurement antennas of the electromagnetic anechoic chamber and transmit the transmitting signal to the wireless terminal through the measurement antennas so as to test the wireless terminal.

* * * * *